United States Patent [19]

Koskan et al.

[11] Patent Number: 5,221,733
[45] Date of Patent: Jun. 22, 1993

[54] MANUFACTURE OF POLYASPARTIC ACIDS

[75] Inventors: Larry P. Koskan, Orland Park; Kim C. Low, Alsip; Abdul R. Y. Meah, Justice; Anne M. Atencio, Riverdale, all of Ill.

[73] Assignee: Donlar Corporation, Bedford Park, Ill.

[21] Appl. No.: 660,355

[22] Filed: Feb. 22, 1991

[51] Int. Cl.$^5$ .................................... C07K 7/10
[52] U.S. Cl. .................... 530/333; 528/328; 528/363; 530/324; 530/339; 530/343; 530/345
[58] Field of Search ............... 530/333, 324, 339, 343, 530/345; 528/328, 363

[56] References Cited

U.S. PATENT DOCUMENTS

| | | |
|---|---|---|
| 4,363,797 | 12/1982 | Jacquet et al. |
| 4,534,881 | 8/1985 | Sikes et al. |
| 4,696,981 | 9/1987 | Harada et al. |
| 4,839,461 | 6/1989 | Boehmke |
| 4,892,733 | 1/1990 | Bichon et al. |
| 4,933,106 | 6/1990 | Sakai et al. |

FOREIGN PATENT DOCUMENTS

| | | |
|---|---|---|
| 3626672A1 | 2/1988 | Fed. Rep. of Germany |
| 3724460A1 | 2/1988 | Fed. Rep. of Germany |
| 219792A5 | 3/1985 | German Democratic Rep. |
| 49-011990 | 2/1974 | Japan |
| 86-177928 | 7/1986 | Japan |

OTHER PUBLICATIONS

Addadi, L. "A Chemical Model for the Cooperation of Sulfates and Carboxylates in Calcite Crystal Nucleation: Relevance to Biomineralization", *Proceedings of the National Academy of Science*, 84:2732-2736, May 1987.
Fox, S. W. Thermal Copolymerization of Amino Acids in the Presence of Phosphoric Acid, *Archives of Biochemistry and Biophysics*, 86:281-285 (1960).
Fox, S. W. "Thermal Polycondensation of Alpha-Amino Acids", *Analytical Methods of Protein Chemistry*, pp. 127-154, Permagon Press, Oxford, 1966.
Harada, K. "Polycondensation of Thermal Precursors of Aspartic Acid", *Journal of Organic Chemistry*, 24:1662-1666, 1959.
Jacobson, A. L. "Magnesium Binding to Poly(L-aspartic Acid)", *Biopolymers*, 3:249-259, 1965.
Kokufuta, E. "Temperature Effect on the Molecular Weight and the Optical Purity of Anhydropolyaspartic Acid Prepared by Thermal Polycondensation", *Bulletin of the Chemical Society of Japan*, 51 (5): 1555-1556, 1978.
Kovacs, J. "Synthesis of Polyglutathione, Polyasparthione, and Related Sequential Polypeptides", *Journal of Organic Chemistry*, 37 (1): 30-34, 1972.
Little et al "Corrosion Inhibition by Thermal Polyaspartate", *Surface Reactive Peptides and Polymers*, pp. 263-279, ACS Symposium Series 444 (1990).
Moschopedis, S. E. "Synthesis of Beta-Poly-Alpha-Ethyl-L-Aspartate", *Canadian Journal of Chemistry*, 49: 2158-2160, 1971.
Neri, P. et al "Synthesis of alpha,beta-Poly[(2-hydroxyethyl)-DL-aspartamide], a New Plasma Expander", *Journal of Medicinal Chemistry*, vol. 16, No. 8, pp. 893-897 (1973).
Pivoca, H. "C NMR Study of the Structure of Poly(aspartic acid)", *Polymer Reports*, 1982.
Saudek, V. "Conformational Study of Poly(alpha-L-aspartic acid)", *Biopolymers*, 21: 1011-1021, 1982.
Saudek, V. "NMR Study of Poly(aspartic acid). II. Alpha— and Beta— peptide Bonds in Poly(aspartic acid) Prepared by Common Methods", *Biopolymers*, 20: 1625-1623, 1981.

(List continued on next page.)

Primary Examiner—Lester L. Lee
Attorney, Agent, or Firm—Dressler, Goldsmith, Shore, Sutker & Milnamow, Ltd.

[57] ABSTRACT

Polyaspartic acid having a weight average molecular weight of 1000 to 5000 is produced by hydrolysis of anhydropolyaspartic acid. Anhydropolyaspartic acid is produced by condensation polymerization of L-aspartic acid. Greater than 80% conversion is achievable utilizing "temperature vs time" profiles.

2 Claims, 4 Drawing Sheets

OTHER PUBLICATIONS

Vegotsky, A. "The Characterization of Polyaspartic Acid and Some Related Compounds", *Journal of the American Chemical Society*, 80: 3361-3366, Jul. 5, 1958.

Yan, J. F. "Conformational Analysis of Macromolecules. V. Helical Structures of Poly-L-aspartic Acid and Poly-L-glutamic acid, and Related Compounds", *The Journal of Chemical Physics*, 49(6): 2713-2726, Sep. 15, 1968.

Yan, J. F. Conformational Analysis of Macromolecules. VI. Helical Structures of o-, M-, and p-Chlorobenzyl Esters of Poly-L-Aspartic Acid", *The Journal of the American Chemical Society*, 92(5): 1109-1115, Mar. 11, 1970.

Okabe, M. et al "Conformational Behavior of Poly(-beta-aspartate) With n-Alkyl Side Chains in the Solid State as Studied by Carbon-13-CP/MAS-NMR Spectroscopy", *Journal Molecular Structure*, 213):213-220 (1989).

Bradbury, E. M. et al "Conformational Transitions of (Benzyl Aspartate)-(Benzyl Glutamate) Copolymers using Carbon-13 Resonance Spectroscopy", *Polypeptides Proteins, Process Rehovot Symposium 2d*, 190-200, 1974.

Rao MVR et al "Calcium Oxalate Crystal Growth Studies in Polyacrylamide Gels Part II. Influence of Synthetic Polypeptides and Natural Macromolecules On Crystal Aggregation", *Indian Journal of Experimental Biology*, 26(7):553-557 (1988).

Fukushima et al "Effect of Ethanol On the Asymmetric Synthesis Catalyzeed by poly(5-Benzyl L-glutamate and Poly(4-benzyl L-aspartate)", *Makromol. Chem.*, 177(9):2617-26 (1976).

Liang et al "Coagulation of Iron Oxide Particles in the Presence of Organic Materials, Application of Surface Chemical Model", *ACS Symposium Series*, 416 (*Chemical Model, Aqueous Systems* 2), 293-298.

Obata et al "Thermal Stabilities of Homopolymers of Amino Acids", *Journal Polymer Science*, Part A-1, 7(6):1415-24 (1969).

Ariely et al "Synthesis of Poly-L-Asparagine and Poly-L-Glutamine", *Biopolymers*, 7(3):417-22 (1969).

Neri et al "Alpha, Beta-Poly(2-hydroxyethyl)-DL-aspartamide", *Macromolecular Synthesis*, 8:25-9 (1982).

Picova et al "Carbon-13 NMR study of the Structure of Poly(aspartic acid)", *Polymer*, 23(8):1237-41 (1982).

Hoagland et al "Hydrolysis of Polyimides", *Experientia*, 29(8): 962-4 (1973).

Woo, E. P. "Preparation and Characterization of Polysuccinimides", *Journal of Polymer Science*, Part A: Polymer Chemistry, 24(11):2823-30 (1986).

Pivcova et al "Conformation of Poly(glutamic acid) and of Poly(aspartic acid) in the solid state. X-ray diffraction, infrared and carbon-13 cross-polarization/-magic angle spinning nuclear magnetic resonance spectroscopic study", *Polymer*, 28(6):991-7.

Ueno et al "Temperature-induced Reversal in Helix Sense of Polyaspartates in Solid Film", *Makromol. Chem.*, 10(12): 683-6 (1989).

Rizvi, T. Z. "Internal Dynamics in Solid Poly-L-asparagine", *Pak. J. Ind. Res.*, 30(4): 266-8 (1987).

Bell et al "Isomeric Bismaleimides and Polyaspartimides", *Journal Polymer Science, Part A: Polymer Chemistry*, 24(10): 2647-55 (1986).

Ueno et al "Photoinduced Conformational Changes of Azoaromatic Polyaspartates Containing Octadecyl Side Chains", *Journal of Polymer Science, Part A: Polymer Chemistry*, 28(5): 1161-70 (1990).

Pivcova et al "Conformation of Poly(glutamic acid) and Poly(aspartic acid) in the Solid State, X-ray Diffraction, Infrared and Carbon-13 Cross-polarization/-Magic Angle Spinning Nuclear Magnetic Resonance Spectroscopic Study", *Polymer*, 28(6):991-7 (1987).

Beigel et al "Poly(aspartic acid)-dependent Fusion of Liposomes Bearing The Quaternary Ammonium Detergent [[[(1,1,3,3-tetramethylbutyl)cresoxy]ethoxy]ethyl]dimethyl benzyl ammonium hydroxide", *Biochemistry*, 27(2):660-6 (1988).

Erenrich et al "Experimental Verification of Predicted Helix Sense of Two Polyamino Acids", *Journal of The American Chemical Society*, 92(5): 1116-19 (1970).

Bradbury et al "Orientation of Polypeptide Side Chains in Solution", *Nature(London)*, 222(5227):65-6 (1970).

Patrone et al "Conformation of Poly-L-Aspartic acid in Aqueous Solution", *Ric. Sci.* 38(12):1205-10 (1968).

Sisido et al "Inframolecular End-to-end Transfer on Polypeptide Chains, Effects of Chain Length, Temperature, and Chain stiffness", *Polymer Journal(Tokyo)*, 17(4):587-95 (1985).

Parker, F. S. "A Raman Spectroscopic Study of the Interactions of Aluminum Ions With Poly-L-Aspartate (List continued on next page.)

OTHER PUBLICATIONS and with Chymotrypsinogen A", *Canadian Journal Spectroscopy*, 30(5):115–19 (1985).

Pivcova et al "Carbon-13 N.M.R. Relaxation Study of Poly(aspartic acid)", *Polymer*, 26(5):667–72.

Yamanobe et al "Carbon-13 NMR Chemical Shift and Electronic Structure of Polypeptide as Studied by Tight-binding MO Theory: Poly(beta-benzyl-L-aspartate) with the Right-handed Alpha-helix and Left-handed Alpha-helix forms", *Chemical Physics*, 99(2):259–64 (1985).

Tsujita et al "Dielectric Studies on Solution of Copoly(ethyl-L-aspartate-benzyl-L-aspartate)", *Sen'i Gakkaishi*, 39(11) T475–T478 (1983).

Ueno et al "Conformational Versatility of Polyaspartates with (p-phenylazo)phenethyl Side Chains in Solid Films", *Makromol. Chem.*, 5(10):639–42 (1984).

Plestil et al "Structure of Polyelectrolyte Solutions, SAXS Study of Poly(aspartic acid)", *Collect. Czech. Chem. Commun.*, 49(11):2586–92 (1984).

White et al "Step-growth polymers from Bismaleimides. Synthesis and Reactions of Some New Polyimides", *Polym. Prepr. (Am. Chem. Soc., Div. Polym. Chem.*, 26(1):132–3 (1985).

Tsujita et al "The Structure and Properties of Copolyaspartate, II Copoly(ethyl-L-aspartate-benzyl L-aspartate) and Copoly(methyl L-aspartate-benzyl L-aspartate)", *Polymer Journal (Tokyo)*, 14(10): 781–8 (1982).

Saudek et al "Conformational Study of Poly(alpha,-beta-L-aspartic acid)", *Biopolymers*, 21(11):2195–203 (1982).

Varma et al "Addition polyimides, II. Polyaspartimide Oligomers", *J. Polymer Science, Polym. Lett. Ed.*, 20(12):621–7 (1982).

Patel et al "Synthesis and Thermal study of Polyamides and Polyaspartimides", 19(2): 101–5 (1983).

Ueno et al "Solvent-induced conformational changes of Arylazo-substituted Polyaspartates", *Bull. Chem. Soc. Japan*, 53(7):1988–92 (1980).

Garti et al "The Inhibitory Effect of Polymeric Carboxylic Amino Acids and Urine on Calcium Oxalate Crystallization", *Urolithiasis: Clinical Basic Res. [Proc. Int. Sym.]*, 4th Meeting Date 1980, edited by Smith et al, pp. 657–62, Plenum: N.Y., N.Y.

Tsujita et al "The Structure and Properties of Copolyaspartate. I. Copoly(butyl L-aspartate-benzyl L-aspartate)", *Polym. J. (Tokyo)*, 14(10):773–9 (1982).

Ueno et al "Conformational Changes of azoaromatic Polyaspartate Induced by Solvent and/or Light", *Macromolecules*, 13(2):459–60 (1980).

Matsuyama et al "Poly(beta-DL-aspartic acid)", *Macromolecules*, 13(1):196–8 (1980).

Lagant et al "Study of Poly(L-aspartic acid). I. Laser Raman Spectrometry", *Polymer J.*, 11(5):345–51 (1979).

Saudek et al "Conformational Study of Poly(alpha-L-aspartic acid)", *Biopolymers*, 21(6):1011–20 (1982).

Harada et al "The Aqueous Thermal Polycondensation of Asparagine and Isoasparagine and the Structure of Polyaspartic Acid", *Poly. Bull. (Berlin)*, 1(3):177–80 (1978).

Eggers et al "Relaxation spectra and Conformational Dynamics of Polyamino Acids", *Stud. Biophys.*, 57:101–4 (1976).

Mattice et al "Disorder-order Transitions induced in Anionic Homopolypeptides by Cationic Detergents", *Biopolymers*, 18(3):723–30 (1979).

Saudek et al "NMR Study of Modified Polysuccinimide", *Prepr. Short Contrib.—Bratislava IUPAC Int. Conf. Modif. Polym.*, 5th, vol. 2, 238–41 (1979).

Kondo et al "Studies of Phosphorus-containing polymers. XIX, Preparation of Phosphorus-containing polysuccinimide-amines", *Kobunshi Ronbunshu*, 36(12):803–8 (1979).

Vlasak et al "Properties and reactivity of polysuccinimide", *J. Polym. Sci., Polym. Symp.*, 66(*Med. Polym.: Chem. Probl.*), 59–64, 63–6.

Drobnik et al "Glycidyl Methacrylate Carriers", *Enzyme Microb. Technol*, 1(2), 107–12 (1979).

Roig et al "Preparation of gamma-benzyl and gamma-methyl poly-L-glutamates and beta-benzyl poly-D-aspartate", *An. R. Soc. Esp. Fis., Quim., Ser. B*, 62(7–8), 925–32 (1966).

Hashimoto et al "Poly (beta-benzyl l-aspartate) helix.

- (List continued on next page.)

OTHER PUBLICATIONS

II. The circular dichroism and optical rotatory dispersion of copolymers of beta-p-methyl-, -chloro-, or cyanobenzyl 1-aspartate with beta-benzyl 1-aspartate", *Bull. Chem. Soc. Jpn.*, 39(12), 2713-20 (1966).

Hashimoto et al "Poly (beta-benzyl 1-aspartate) helix, I. The synthesis and optical rotatory dispersion of copolymers of beta-p-methyl-, -chloro-, cyano, or nitrobenzyl 1-aspartate with beta-benzyl 1-aspartate", *Bull. Chem. Soc. Jpn.*, 39(12), 2707-13 (1966).

Sayama et al "Solution properties of synthetic polypeptides, XI. Solvent effect on helix-coil transition in polypeptides", *Polym. J.*, 3(5), 538-50 (1972).

Williot et al "Conformations of branched poly(alpha-amino acids) in solution and at the air-water interface", *J. Polym. Sci., Polym. Phys. Ed.*, 10(11), 2125-34 (1972).

Kyotani et al "Effect of molecular weight on conformation of poly(beta-benzyl L-aspartate) in films", *J. Polym. Sci.*, Part A-2, 10(10), 1931-9 (1972).

Erenrich et al "Dipole moments and the conformations of polypeptides, I. Compounds related to poly(beta-benzyl L-aspartate)", *Macromolecules*, 5(6), 746-54 (1979).

Bradbury et al "Conformational studies of polymers and copolymers of L-aspartate esters. III. Nuclear magnetic resonance spectroscopy", *Macromolecules*, 4(5), 557-64.

Erenrich, E. H. "Optical and dielectric properties of some compounds related to poly-beta-benzyl-L-aspartate", *Diss. Abstr. Int. B.* 1972 32(8), 4514 (1971).

Silverman et al "Nuclear magnetic resonance of the side-chain conformation of alpha-helical poly(beta-benzyl-L-aspartate)", *Arch. Biochem. Biophys.*, 146(2), 587-90 (1971).

Moschopedis et al "Synthesis of beta-poly(alpha-ethyl-L-aspartate)", *Can. J. Chem.*, 49(12), 2158-60 (1971).

Rodin, R. L. "Investigation of the synthesis of poly-B-L aspartic acid and poly-(gamma-L-glutamyl-)-B-L-aspartic acid and the selective reduction of the carbobenzoxy amino acid and peptide p-nitrophenyl esters", *Diss. Abstr. Int. B* 1969, 30(3), 1951-2 (1969).

Teramoto et al "Solution properties of synthetic polypeptides XII. Enthlapy changes accompany helix-coil transition of polypeptide", *Biopolymers*, 11(8), 1693-700 (1972).

Aragao et al "Synthesis and characterization of polymers of o-, m-, and p-nitrobenzyl beta-L-aspartates", *Bull. Soc. Chim. Fr.*, (12), 4387-91 (1971).

Norisuye et al "Solution properties of synthetic polypeptides. XVI. Hydrogen bonding in helix-coil transitions of poly(beta-benzyl L-aspartate)", *Biopolymers*, 12(7), 1533-41 (1973).

Crivello, J. V. "Polyaspartimides, Condensation of aromatic diamines and bismaleimide compounds", *J. Polym. Sci., Chem. Ed.*, 11(6), 1185-200 (1973).

Fujimoto et al "Poly(amino acids) as surfactants in detergents and cosmetics", *J. Amer. Chem. Soc.*, 95(5), 1683-4 (1973).

Bradbury et al "Conformational studies of polymers and copolymers of poly(L-aspartate esters), IV. Infrared studies of the side-chain orientations in solid films", *Macromolecules*, 5(1), 8-12 (1972).

Toriumi et al "Conformational studies of poly(beta-phenethyl L-aspartate)", *Polym. J.*, 11(12), 977-81 (1979).

Ogura et al "Temperature dependence on the amide V band in the infrared spectrum of poly(beta-benzyl-L-aspartate)", *J. Polym. Sci., Polym. Lett. Ed.*, 13(12), 717-19 (1975).

Aubert et al "Synthesis and conformational studies of alternating poly(beta-p-nitrobenzyl-L-aspartate-beta-benzyl-L-aspartate), a right-handed/left-handed alpha-helix-type conformation", *Biopolymers*, 14(11), 2429-33 (1975).

Kokufuta et al "Temperature effect on the molecular weight and the optical purity of anhydropolyaspartic acid prepared by thermal polycondensation", *Bull. Chem. Soc. Jpn.*, 51(5), 1555-6 (1978).

Kokufuta et al "Potentiometric titration behavior of polyaspartic acid prepared by thermal polycondensation", *Biosystems*, 9(4), 211-14 (1977).

Suzuki et al "Carbon-13 and proton NMR studies of helix-coil transition of poly(beta-benzyl-L-aspartate) and poly (gamma-benzyl-L-glutamate): behavior in nonprotonating solvent mixtures, and origin of solvent-induced chemical shifts", *Biopolymers*, 16(11), 2521-32 (1977).

Kokufuta, E. Bulletin of the Chemical Society of Japan, 51(5); 1555-1556, 1978.

Little et al., *Corrosion Inhibition by Thermal Polyaspartate* pp. 263-279, ACS Symposium Series 444 (1990).

Pivcova, H. C NMR *Study of the Structure of Poly(aspartic acid)*, Polymer Reports, 1982.

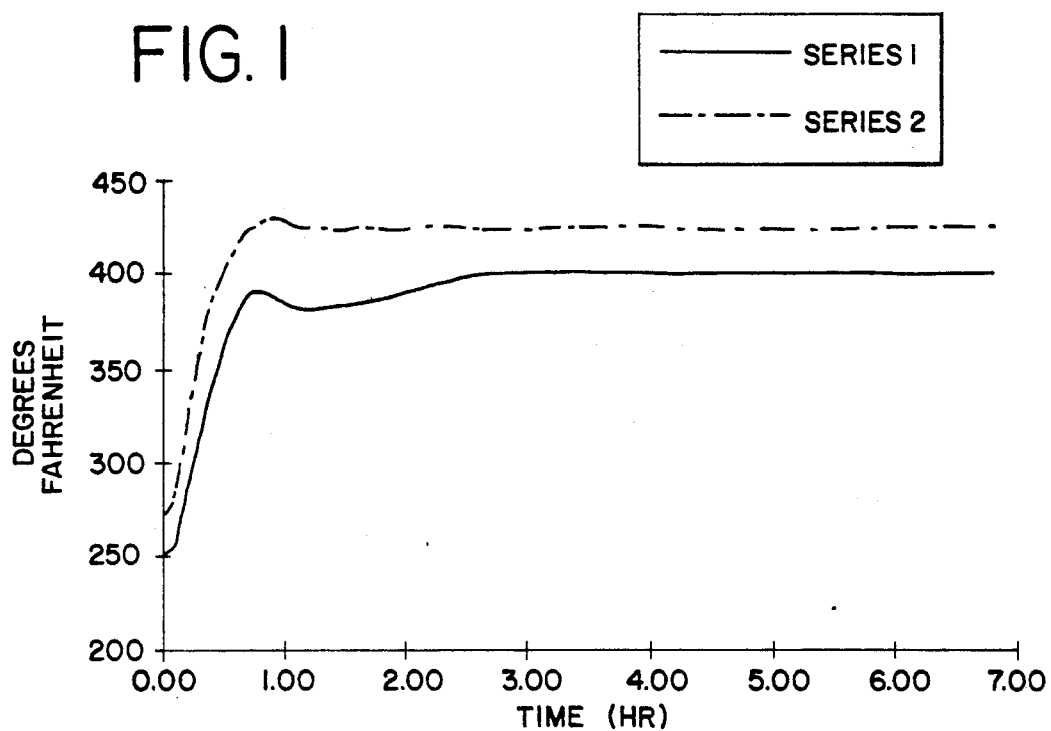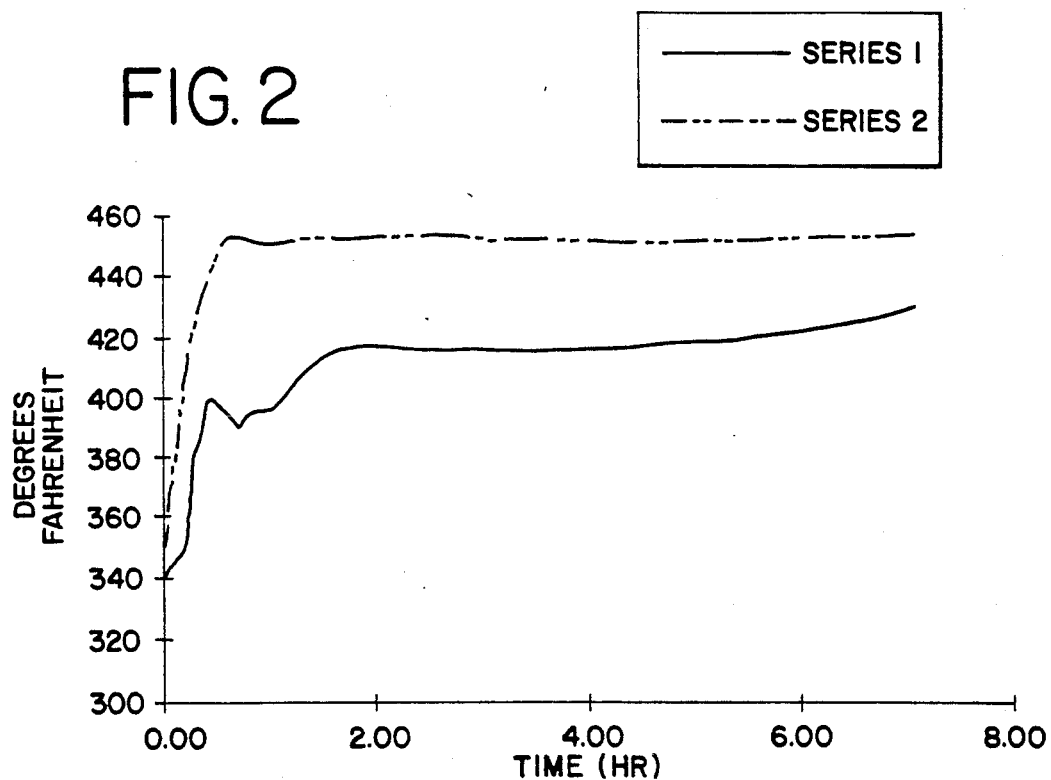

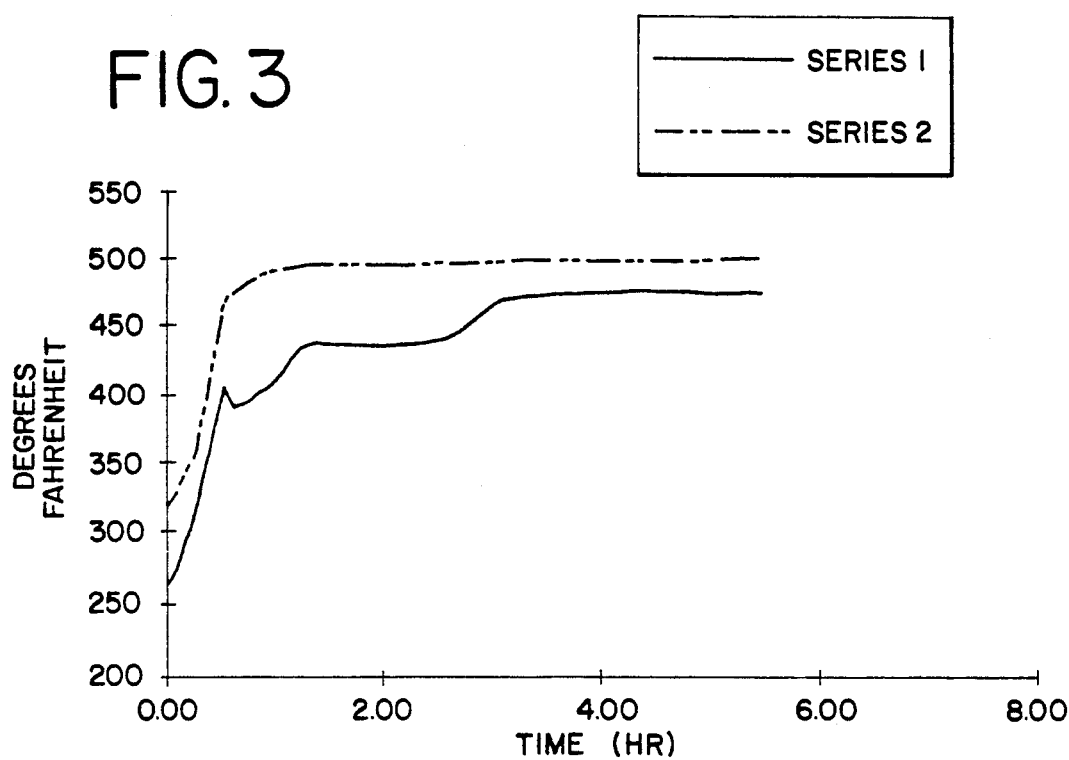
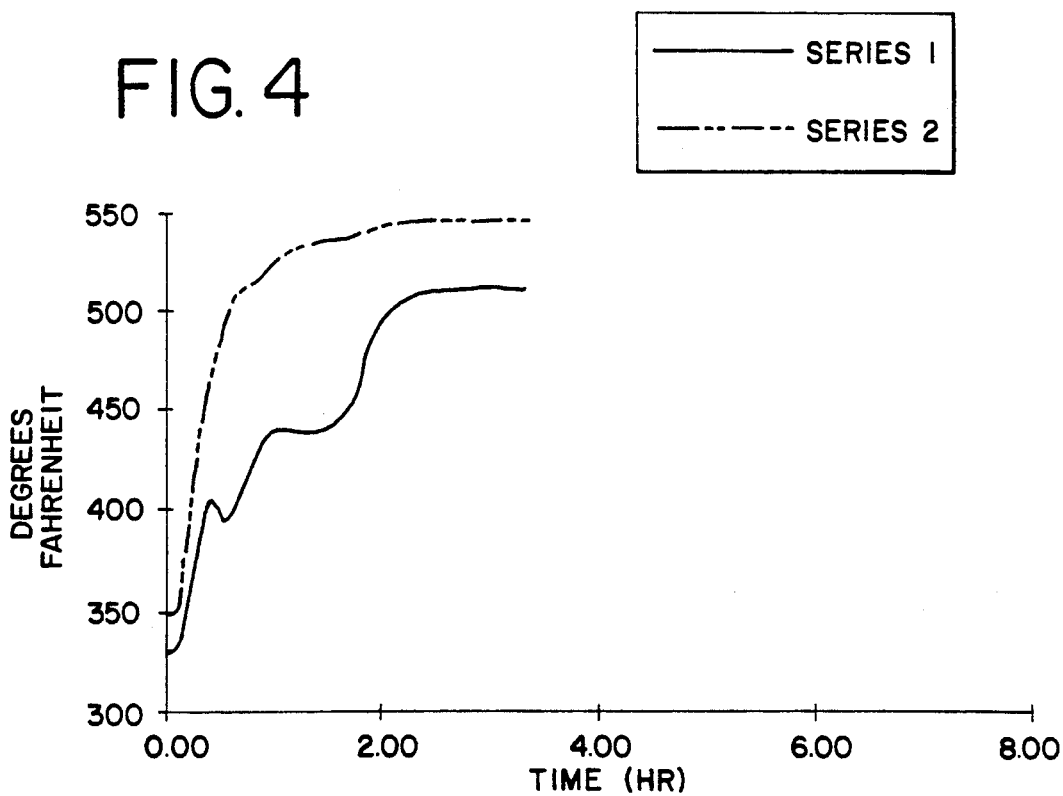

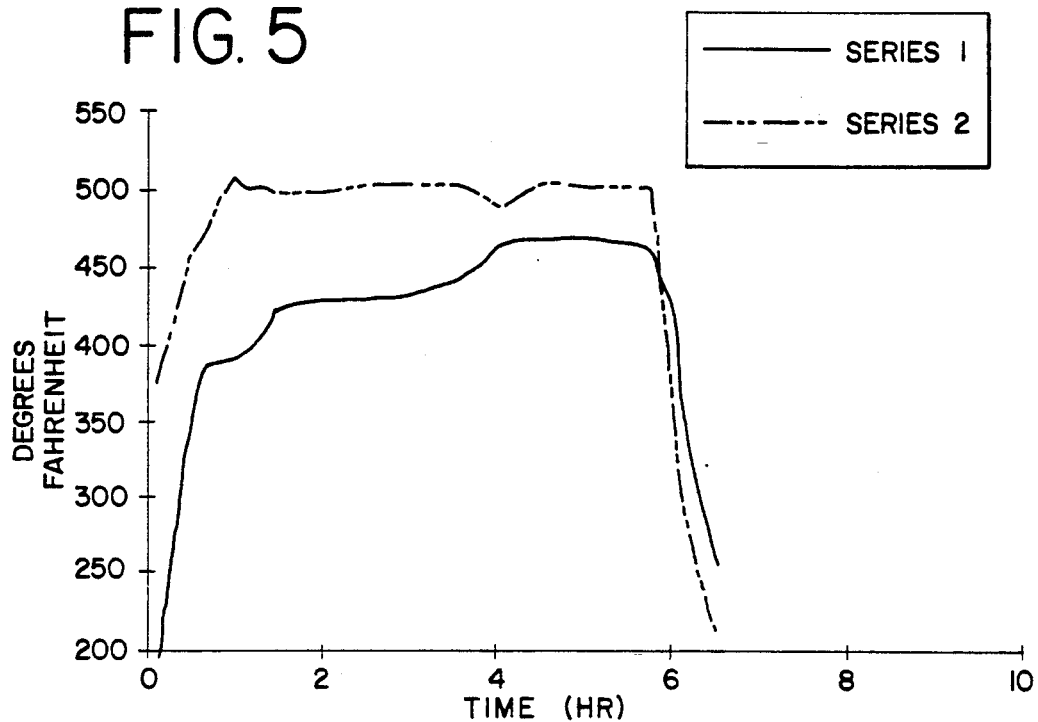
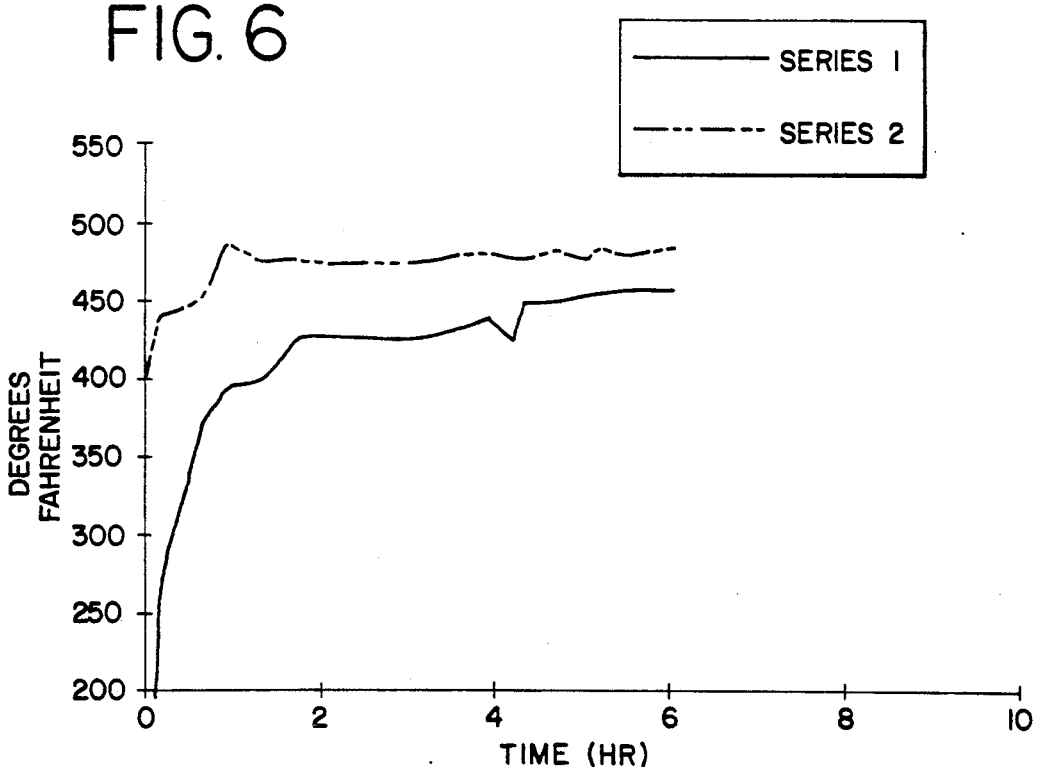

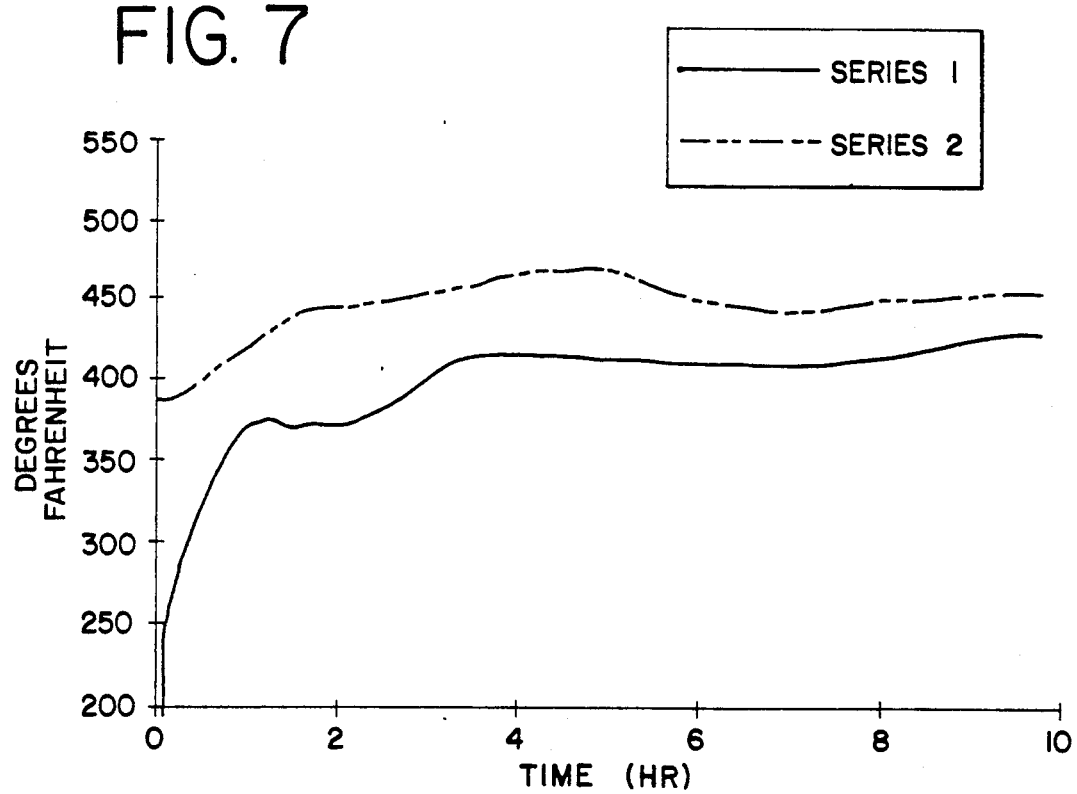

MANUFACTURE OF POLYASPARTIC ACIDS

FIELD OF THE INVENTION

The present invention relates to a method of polymerizing aspartic acid and relates to polysuccinimides and polyaspartic acids.

BACKGROUND OF THE INVENTION

Polyaspartic acids have utility as calcium carbonate and calcium phosphate inhibitors. Their biodegradability makes them particularly valuable from the point of view of environmental acceptability and waste disposal.

Anhydropolyaspartic acids (i.e. polysuccinimides) are the anhydrous forms of polyaspartic acids.

Thermal condensation of aspartic acid to produce polyaspartic acid is taught by Etsuo Kokufuta, et al., "Temperature Effect on the Molecular Weight and the Optical Purity of Anhydropolyaspartic Acid Prepared by Thermal Polycondensation", Bulletin of the Chemical Society Of Japan, Vol. 51 (5), 1555–1556 (1978). Kokofuto teaches that the molecular weight of the polyaspartic acid produced by this method increases with increased reaction temperature. Moreover, the maximum percent conversion of the aspartic acid to anhydropolyaspartic acid suggested is no more than 68% using oil bath temperatures of between 325° F. and 425° F.

A more recent work by Brenda J. Little et al, "Corrosion Inhibition By Thermal Polyaspartate" *Surface Reactive Peptides and Polymers*, pp 263–279, American Chemistry Society Symposium Series 444(1990), cited Kokofuto. Oil bath temperatures of 374° F. were used to produce anhydropolyaspartic acid from powdered aspartic acid over a period of 24 to 96 hours. The results were no better than Kokofuto's.

SUMMARY

We have discovered how to produce a much higher percent conversion polyaspartic acid than has been taught or suggested by the prior art. Moreover, contrary to the teachings of the prior art, the molecular weight of the polyaspartic acid produced by our method does not increase with the reaction temperature.

We have discovered that the thermal condensation of powdered L-aspartic acid to produce polysuccinimide in high yields optimally occurs above the initiation temperature of about 370° F. and preferably occurs above 420° F., and most preferably occurs above 440° F.

A reactant temperature less than 370° F. may produce polysuccinimide over a period of many hours. Theoretical yields will be low; the conversion of the L-aspartic acid to polysuccinimide will be less than 70% and will require a period of many days.

As the reactant temperature increases above 370° F., the percent conversion increases to greater than 90% and the reaction times become greatly reduced.

The thermal condensation of L-aspartic acid to polysuccinimide according the method of our invention produces a characteristically shaped "temperature vs. time" reaction curve. The curve is characterized by an initial, rapid rise in reactant temperature, followed by an endotherm signally the beginning of the reaction. Immediately following the onset of the endotherm there is evaporative cooling, followed first by a temperature rise, and then by a second endotherm, which is followed by an evaporative cooling plateau. The temperature then rises to a plateau. That plateau is at a constant temperature. The reaction has gone to at least 95% conversion at the temperature midway between the final plateau and the time the temperature begins to rise to that plateau.

Polyaspartic acid is produced from the polysuccinimide by base hydrolysis.

The polyaspartic acid produced has a weight average molecular weight of 1000 to 5000. This molecular weight range is uniform regardless of the percent conversion.

The percent conversion of the L-aspartic acid to the polysuccinimide can be increased in reduced time periods by increasing the temperatures used.

Where the thermal fluid used to heat the L-aspartic acid is brought to 500° F. in a reasonable time period, at least 90% conversion can be effected within 4 hours.

Where the thermal fluid used to heat the L-aspartic acid is brought to a maintenance temperature of at least 550° F. within a reasonable time period, at least 90% conversion can be effected within 2 hours.

Continuous and batch processes can be used. Some process examples include fluidized bed; stirred reactor; and indirectly, heated rotary driers.

THE FIGURES

FIG. 1 depicts a temperature versus time reaction curve. Series 2 is the oil temperature. Series 1 is the reaction mixture temperature.

FIG. 2 depicts a temperature versus time reaction curve. Series 2 is the oil temperature. Series 1 is the reaction mixture temperature.

FIG. 3 depicts a temperature versus time reaction curve. Series 2 is the oil temperature. Series 1 is the reaction mixture temperature.

FIG. 4 depicts a temperature versus time reaction curve. Series 2 is the oil temperature. Series 1 is the reaction temperature.

FIG. 5 depicts a temperature versus time reaction curve. Series 2 is the oil temperature. Series 1 is the reaction temperature.

FIG. 6 depicts a temperature versus time reaction curve. Series 2 is the oil temperature. Series 1 is the reaction mixture temperature.

FIG. 7 depicts a temperature versus time reaction curve. Series 2 is the oil temperature. Series 1 is the reaction mixture temperature.

DISCUSSION

A series of experiments were conducted to thermally polymerize solid phase L-aspartic acid. In each instance, the powdered L-aspartic acid was added to a reaction vessel and heated. Samples were taken throughout the polymerization reaction. Those samples were analyzed for percent conversion to the product, polysuccinimide, and the color and temperature of the samples were noted. The polysuccinimide was then hydrolyzed to produce polyaspartic acid, and activity tests were conducted on the polyaspartic acid.

Each of these, conversion, color, production of polyaspartic acid, and activity are described below.

The following procedure was utilized to determine the percent conversion of the L-aspartic acid to the product, polysuccinimide:

THE DETERMINATION OF CONVERSION Of L—ASPARTIC ACID TO POLYSUCCINIMIDE

A specific amount of the reaction mixture or product was dissolved in an aliquot of dimethylformamide (DMF). The dissolution was allowed to proceed for 4 to 5 hours until all of the polysuccinimide dissolved in the DMF leaving unreacted L-aspartic acid which was filtered out. The amount of unreacted L-aspartic acid was determined by using the following formula:

$$\% \text{ CONVERSION} = \frac{A - B}{A} * 100\%$$

Where:
A = weight of initial sample
B = weight of filtrate

COLOR

The color of each product sample was noted. The color of L-aspartic acid is white. The samples containing polysuccinimide varied in color according to the temperature of the sample taken from the reaction mixture. From low temperature to high, the colors varied as follows: light pink, to pink, to tannish pink, to tan, to light yellow, to yellow. These colors generally corresponded to the percent conversion of the L-aspartic acid, in the same order with light pink indicating the lowest percent conversion and yellow indicating the highest percent conversion. The pink colors had less than 70% conversion. The literature has never reported any other color but pink.

POLYASPARTIC ACID

Polyaspartic acid was produced from polysuccinimide using the following hydrolysis procedure:

Hydrolysis procedure for making polyaspartic acid from polysuccinimide.

A slurry was made from a measured amount of polysuccinimide and distilled water. Sodium hydroxide was added dropwise to hydrolyze polysuccinimide to polyaspartic acid. The completion of the hydrolysis was attained at pH 9.5.

Bases other than sodium hydroxide can be used. Suitable bases include ammonium hydroxide, potassium hydroxide, and other alkaline and alkaline earth hydroxides.

Generally, base should be added to the slurry until the pH has been raised to 9.5, and a clear solution has been formed.

ACTIVITY TEST

Polyaspartic acid was produced from the samples of polysuccinimide. The activity of the polyaspartic acid as an inhibitor for preventing the precipitation of calcium carbonate was determined as described in the test below:

A standard volume of distilled water was pipetted into a beaker. Inhibitor was added after the addition of a calcium chloride solution, but prior to the addition of a solution of sodium bicarbonate. Sodium hydroxide was then added to the solution until there was an apparent and sudden calcium carbonate precipitation evidenced by the cloudiness of the solution.

At this point the pH dropped, the addition of the sodium hydroxide was stopped, and the pH was recorded. The volume of sodium hydroxide consumed was noted. The pH drop after ten minutes was recorded.

The amount of inhibitor used was adjusted to provide a constant weight of polyaspartic acid in each of the tests.

The activity of the inhibitor was judged by the volume of sodium hydroxide consumed and by the pH drop. The greater the amount of sodium hydroxide needed, the greater the activity of the product as an inhibitor. The smaller the pH drop, the greater the activity of the product as an inhibitor.

MOLECULAR WEIGHT DETERMINATION

Gel permeation chromatography was utilized to determine the molecular weights of the polyaspartic acid produced. The molecular weight determinations were made on the polysuccinimide that was hydrolyzed using the hydrolysis procedure described herein.

Rohm & Haas 2000 Mw polyacrylic acid and Rohm & Haas 4500 Mw polyacrylic acid were utilized as standards. The molecular weights provided for the polyaspartic acid produced according to this invention are based on these standards unless otherwise noted, and are reported as weight average molecular weights, (Mw). This is because molecular weights based on gel permeation chromatography can vary with the standards utilized.

It was found that the molecular weight for the polyaspartic acid produced fell within the range of 1000 Mw to 5000 Mw, regardless of percent conversion.

DEFINITIONS

The term polyaspartic acid used herein also includes salts of polyaspartic acid. Counterions for polyaspartate include, but are not limited to, the alkaline and alkaline earth cations, some examples of which are $Na^+$, $K^+$, $Mg^+$, and $Li^+$, $Ca^{++}$, $Zn^{++}$, $Ba^{++}$, $Co^{++}$, $Fe^{++}$, $Fe^{+++}$, and $NH_4^+$.

Polysuccinimide is the imide form of polyaspartic acid and is also known as anhydropolyaspartic acid.

Conversion is defined to be the degree to which L-aspartic acid has formed polysuccinimide by thermal condensation.

Equilibrium temperature is defined to be the temperature of the product upon completion of the reaction.

EXPERIMENTS

Reported below are examples of the production of polysuccinimide and polyaspartic acid.

Laboratory Experiment 1

A "time vs. temperature" plot of the following reaction is depicted in FIG. 1.

A 500 ml covered, stainless steel, beaker charged with 400 grams of powdered L-aspartic acid was placed in an oil bath. The oil bath was quickly heated to a 425° F. maintenance temperature. The sample was stirred throughout the experiment.

At 40 minutes, the reaction began when the first endotherm was reached. The first endotherm of the reaction mixture peaked at 390° F. at an oil temperature of 425° F. which was the maintenance temperature.

Evaporative cooling immediately followed this first endotherm. Water loss was evidenced by the evolution of steam. The reaction mixture temperature dropped to a low of 360° F. during this period. Following the temperature drop, the reaction mixture began to heat up. At 2.75 hours, the reaction mixture attained a plateau temperature of 400° F. At the end of 6.88 hours, 42 percent conversion had been attained. Steam coming from the system evidenced water loss throughout the entire endothermic reaction. Evaporative cooling still continued to take place. The experiment was concluded after the seven hour experiment.

Table 1 below provides data developed during this experiment. Samples were taken at the times indicated and analyzed for percent conversion to polysuccinimide.

The relative activity of polyaspartic acid produced from the the product polysuccinimide was determined by the activity test described above. Activity is reported in terms of pH drop (δpH) and milliliters (mls) of sodium hydroxide, as described in the Activity test.

The color of the reaction mixture is provided. Color was observed to vary with product temperature.

TABLE 1

| POLYMERIZATION | | | ACTIVITY TEST | | |
|---|---|---|---|---|---|
| Time hr | Product °F. | Oil °F. | Conv % | NaOH ml | δpH | Color |
| 0.0 | 250 | 270 | 0 | 0.95 | 1.47 | LP |
| 1.0 | 386 | 430 | 5 | — | — | LP |
| 1.7 | 385 | 425 | 13 | 1.75 | 0.56 | P |
| 3.4 | 401 | 425 | 26 | 1.75 | 0.56 | P |
| 5.0 | 400 | 424 | 27 | 1.75 | 0.56 | P |
| 6.9 | 400 | 425 | 42 | 1.80 | 0.57 | P |

The following definitions apply through out this writing: LP = light pink; LY = light yellow; P = Pink; T = Tan; W = White; Y = Yellow; Conv = Conversion; δpH = activity test pH drop; hr = hours Laboratory Experiment 2

A "time vs. temperature" plot of the following reaction is depicted in FIG. 2.

A 500 ml covered, stainless steel, beaker charged with 400 grams of powdered, L-aspartic acid was placed in an oil bath. The oil bath was quickly heated to a 450° F. maintenance temperature. The sample was stirred throughout the experiment.

At 30 minutes, the reaction began when the first endotherm was reached. The first endotherm of the reaction mixture peaked at 395° F. at an oil temperature of 439° F.

Evaporative cooling immediately followed this first endotherm. Water loss was evidenced by the evolution of steam. The reaction mixture temperature dropped to a low of 390° F. during this period and the oil temperature rose to the 450° F. maintenance temperature.

Following the temperature drop, the reaction mixture began to heat up. At 1.67 hours, a second endotherm occurred. At this endotherm, the reaction mixture temperature was 420° F. and the oil temperature was 450° F. Steam coming from the system evidenced water loss.

Evaporative cooling continued to take place until the conclusion of the second endotherm. Water loss was evidenced by the evolution of steam. At the conclusion of this period, the reaction mixture was then heated up and maintained at an equilibrium temperature of 434° F.

Table 2 below provides data developed during this experiment. Samples were taken at the times indicated and analyzed for percent conversion to polysuccinimide.

The relative activity of polyaspartic acid produced from the the product polysuccinimide was determined by the activity test described above. Activity is reported in terms of pH drop (δpH) and milliliters (mls) of sodium hydroxide, as described in the activity test.

The color of the reaction mixture is provided. Color was observed to vary with product temperature.

TABLE 2

| POLYMERIZATION | | | ACTIVITY TEST | | |
|---|---|---|---|---|---|
| Time hr | Product °F. | Oil °F. | Conv % | NaOH ml | δpH | Color |
| 0.0 | 340 | 345 | 0 | 0.95 | 1.47 | W |
| 0.5 | 400 | 440 | 22 | — | — | LP |
| 1.1 | 396 | 451 | 23 | 1.75 | 0.59 | LP |
| 1.7 | 422 | 457 | 32 | 1.80 | 0.57 | P |
| 4.2 | 416 | 451 | 58 | 1.81 | 0.61 | P |
| 5.5 | 420 | 452 | 81 | 1.80 | 0.63 | T |
| 7.1 | 430 | 454 | 97 | 1.75 | 0.69 | T |

Laboratory Experiment 3

A "time vs. temperature" plot of the following reaction is depicted in FIG. 3.

A 500 ml covered, stainless steel, beaker charged with 400 grams of powdered, L-aspartic acid was placed in an oil bath. The oil bath was quickly heated to a 500° F. maintenance temperature. The reaction mixture was stirred throughout the experiment.

At 30 minutes, the reaction began when the first endotherm was reached. The first endotherm of the reaction mixture peaked at 405° F. at an oil temperature of 465° F.

Evaporative cooling immediately followed the first endotherm. Water loss was evidenced by the evolution of steam. The reaction mixture temperature dropped to a low of 390° F. during this period, and the oil temperature rose to 490° F.

At 1.25 hours, a second endotherm occurred. At this second endotherm, the reaction mixture temperature was 438° F. and the oil temperature was 495° F.

Evaporative cooling continued to take place until the conclusion of the second endotherm. Water loss was evidenced by the evolution of steam. The reaction mixture temperature dropped to a low of 432° F. during this period and the oil temperature rose to 599° F.

A diminution in evaporative cooling was evidenced by a steady rise in reaction mixture temperature between approximately 2.65 hours and 3.17 hours. At 3.17 hours a temperature plateau was attained. No further increase in conversion was noted beyond that point.

Table 3 below provides data developed during this experiment. Samples were taken at the times indicated and analyzed for percent conversion to polysuccinimide.

The relative activity of polyaspartic acid produced from the the product polysuccinimide was determined by the activity test described above. Activity is reported in terms of pH drop (δpH) and milliliters (mls) of sodium hydroxide, as described in the activity test.

The color of the reaction mixture is provided. Color was observed to vary with product temperature.

TABLE 3

| POLYMERIZATION | | | ACTIVITY TEST | | |
|---|---|---|---|---|---|
| Time hr | Product °F. | Oil °F. | Conv % | NaOH ml | δpH | Color |
| 0.0 | 256 | 316 | 0 | 0.95 | 1.47 | W |
| 0.5 | 406 | 464 | 7 | — | — | LP |
| 1.3 | 437 | 496 | 43 | 1.80 | 0.56 | P |
| 2.3 | 438 | 497 | 81 | 1.80 | 0.56 | P |
| 3.1 | 470 | 499 | 90 | 1.80 | 0.67 | TP |
| 3.8 | 476 | 500 | 95 | 1.80 | 0.63 | TP |

TABLE 3-continued

| POLYMERIZATION | | | | ACTIVITY TEST | | |
|---|---|---|---|---|---|---|
| Time hr | Product °F. | Oil °F. | Conv % | NaOH ml | δpH | Color |
| 6.0 | 476 | 502 | 98 | 1.80 | 0.63 | LY |

Laboratory Experiment 4

A "time vs. temperature" plot of the following reaction is depicted in FIG. 4.

A 500 ml covered, stainless steel, beaker charged with 400 grams of powdered, L-aspartic acid was placed in an oil bath. The oil bath was quickly heated to a 550° F. maintenance temperature. The sample was stirred throughout the experiment.

At 24 minutes, the reaction began when the first endotherm was reached. The first endotherm of the reaction mixture peaked at 410° F. at an oil temperature of 470° F.

Evaporative cooling immediately followed the first endotherm. Water loss was evidenced by the evolution of steam. The reaction mixture temperature dropped to a low of 395° F. during this period.

A second endotherm occurred at 1 hour at a reaction mixture temperature of 442° F.

Evaporative cooling continued to take place until the conclusion of the second endotherm. The reaction mixture temperature dropped to a low of 440° F. during this period.

A diminution in evaporative cooling was evidenced by a steady rise in reaction mixture temperature between approximately 1.5 hours and 2.06 hours. At 2.06 hours a temperature plateau was attained. No further increase in percent conversion was noted beyond 1.95 hours.

Table 4 below provides data developed during this experiment. Samples were taken at the times indicated and analyzed for percent conversion to polysuccinimide.

The relative activity of polyaspartic acid produced from the the product polysuccinimide was determined by the activity test described above. Activity is reported in terms of pH drop (δpH) and milliliters (mls) of sodium hydroxide, as described in the activity test.

The color of the reaction mixture is provided. Color was observed to vary with product temperature.

TABLE 4

| POLYMERIZATION | | | | ACTIVITY TEST | | |
|---|---|---|---|---|---|---|
| Time hr | Product °F. | Oil °F. | Conv % | NaOH ml | δpH | Color |
| 0.0 | 330 | 348 | 0 | 0.95 | 1.47 | W |
| 0.5 | 405 | 470 | 11 | — | — | LP |
| 1.0 | 436 | 520 | 36 | 1.80 | 0.60 | LP |
| 1.4 | 439 | 536 | 66 | 1.80 | 0.67 | P |
| 1.8 | 462 | 540 | 92 | 1.80 | 0.58 | TP |
| 2.0 | 495 | 544 | 94 | 1.75 | 0.64 | TP |
| 2.4 | 510 | 547 | 96 | 1.75 | 0.58 | LY |
| 3.4 | 512 | 548 | 98 | 1.80 | 0.63 | Y |

Production scale product runs were conducted as follows:

Pilot Plant Test Run #1

A "time vs. temperature" plot of the following reaction is depicted in FIG. 5.

A DVT-130 drier, mixer manufactured by the Littleford Brothers, Inc., of Florence, Ky. was used. The jacketed drier utilizes a thermal fluid (hereinafter called "oil"), a plough blade impeller, a stack open to the atmosphere; and has a heat transfer area of 10 ft$^2$. The reactor's oil reservoir was preheated to 550° F.

The reactor was charged with 110.4 lb of powdered, L-aspartic acid. Hot oil began to flow through the jacket, and the impeller speed was set at 155 rpm. Both the product and oil temperatures rose steadily. At a product temperature of 390° F., there was a sudden, endothermic reaction which caused the product temperature to drop (see FIG. 5). Water loss was evidenced by the evolution of steam. A sample taken revealed that the powder had changed from white to pink. Three percent of the material was converted to polysuccinimide.

Thereafter, product temperature began to rise steadily until it reached a plateau at 428° F. which continued for an hour. Throughout this whole reaction, steam evolved, and the conversion increased in a linear fashion. At the end of the hour, the product temperature rose to 447° F. at which time the reaction underwent a second endotherm. Immediately after this endotherm, steam ceased to evolve. Shortly after this point, the reaction was at least 88% complete. Following the second endotherm, the product slowly changed from a pink to a yellow color. The final conversion was measured at 97%.

Table 5 below provides data developed during this experiment. Samples were taken at the times indicated and analyzed for percent conversion to polysuccinimide.

TABLE 5

| POLYMERIZATION | | | |
|---|---|---|---|
| Time hr | Product °F. | Oil °F. | Conv % |
| 0.0 | 70 | 375 | 0 |
| 0.8 | 390 | 394 | 3 |
| 1.1 | 396 | 504 | 15 |
| 1.5 | 423 | 501 | 24 |
| 2.0 | 430 | 500 | 41 |
| 2.6 | 430 | 506 | 61 |
| 3.6 | 444 | 505 | 84 |
| 4.5 | 471 | 508 | 88 |
| 5.8 | 466 | 506 | 97 |

Pilot Plant Test Run #2

A "time vs. temperature" plot of the following reaction is depicted in FIG. 6.

A Littleford DVT-130 drier, mixer with a heat transfer area of 10ft$^2$, was charged with 110.4 lb of powdered, L-aspartic acid, and the oil reservoir was preheated to 525° F.

At the start up, hot oil began to flow through the jacket, and the impeller speed was set at 155 rpm. Both the product and oil temperatures rose steadily. The product temperature rose to 393° F. whereupon a sudden, endothermic reaction caused the product temperature to drop (see FIG. 6) and steam began to evolve. A sample taken revealed that the powder had changed from white to pink. Four percent of the material was converted to polysuccinimide. Thereafter, product temperature began to rise steadily until it reached a plateau at 427° F. which continued for one and a half hours. Throughout this whole reaction, steam was evolved, and the conversion increased in a linear fashion. At the end of this time, the product temperature rose to 444° F. until the reaction underwent a second endotherm. Immediately after this second endotherm, steam ceased to evolve. Shortly after this point, the reaction was at least 94% complete. Following the second endotherm, the product slowly changed from a pink to a yellow color. The final conversion was measured at 98%.

Table 6 below provides data developed during this experiment. Samples were taken at the times indicated and analyzed for percent conversion to polysuccinimide.

TABLE 6

| Time hr | POLYMERIZATION Product °F. | Oil °F. | Conv % |
|---|---|---|---|
| 0.0 | 70 | 400 | 0 |
| 1.0 | 393 | 488 | 5 |
| 1.3 | 400 | 476 | 18 |
| 2.0 | 428 | 475 | 20 |
| 3.9 | 441 | 480 | 66 |
| 4.4 | 450 | 477 | 85 |
| 5.1 | 456 | 476 | 94 |
| 6.1 | 457 | 484 | 98 |

Pilot Plant Test Run #3

A "time vs. temperature" plot of the following reaction is depicted in FIG. 7.

A "B" blender, manufactured by J. H. Day of Cincinatti, Ohio was charged with 110.4 lb of powdered, L-aspartic acid. The unit was a trough-shaped blender with a plough-bladed impeller and a heat transfer area of approximately 8 ft². The reactor was wrapped in fiberglass insulation because the oil heater was undersized. The reactor also had a large funnel in a top port open to the atmosphere. The oil reservoir was preheated to 500° F. At the start up hot oil began to flow through the jacket, and the impeller began to rotate at 74 rpm. Both the product and oil temperatures rose steadily. The product temperature rose to 377° F. whereupon a sudden, endothermic reaction caused the product temperature to drop (see FIG. 7) and steam began to evolve. A sample taken revealed that the powder had changed from white to pink. Thirteen percent of the material was converted to polysuccinimide. Thereafter, product temperature began to rise steadily until it reached a plateau at 416° F. which continued for 3.75 hours. Throughout this whole reaction, steam was evolved, and the conversion increased in a linear fashion. Due to the heater being undersized, it took a longer time for the product temperature to rise. At the end of this time, the product temperature rose to 435° F. The reaction was at least 88% complete. Due to time limitations, the reaction was stopped when the product temperature reached the plateau. At this point, the final conversion was measured at 90%.

Table 7 below provides data developed during this experiment. Samples were taken at the times indicated and analyzed for percent conversion to polysuccinimide.

TABLE 7

| Time hr | POLYMERIZATION Product °F. | Oil °F. | Conv % |
|---|---|---|---|
| 0.0 | 55 | 390 | 0 |
| 1.0 | 370 | 420 | 0 |
| 2.3 | 377 | 448 | 13 |
| 3.0 | 403 | 455 | 21 |
| 3.5 | 416 | 460 | 26 |
| 4.0 | 417 | 469 | 32 |
| 4.5 | 416 | 471 | 38 |
| 5.0 | 416 | 472 | 45 |
| 5.5 | 415 | 460 | 52 |
| 6.8 | 413 | 446 | 64 |
| 7.3 | 414 | 448 | 70 |
| 7.8 | 418 | 451 | 74 |

TABLE 7-continued

| Time hr | POLYMERIZATION Product °F. | Oil °F. | Conv % |
|---|---|---|---|
| 8.3 | 422 | 455 | 81 |
| 9.3 | 433 | 460 | 88 |
| 9.8 | 435 | 460 | 90 |

The experiments show that degree of conversion of L-aspartic acid and the time required for conversion is related to the temperature of the reaction mixture.

The higher the temperature of the thermal fluid used to heat the reaction mixture, the higher the degree of polymerization and the faster the rate of conversion.

Because of normal heat losses the temperature of the thermal fluid will always be higher than the temperature of the reaction mixture. It is known that increasing the temperature of the thermal fluid will increase the driving force of the reaction. Assuming that the thermal fluid temperature will be raised to its maintenance temperature in a reasonably short period of time, we have found that generally the following has held true:

Where the oil maintenance temperature was 425° F., at the end of 5 days only 60% conversion was achieved. The equilibrium temperature of the reaction mixture appeared to be 400° F.

Where the oil maintenance temperature was 450° F., 90% conversion took place within 7 hours. The equilibrium temperature of the reaction mixture is not known.

Where the oil maintenance temperature was 500° F., 90% conversion took place within 4 hours. The equilibrium temperature of the reaction mixture was 477° F.

Where the oil maintenance temperature was 550° F., 90% conversion took place within 2 hours. The equilibrium temperature of the reaction mixture was 510° F.

The difference between the maintenance temperature and the reaction temperatures provides the driving force. Different means for providing the thermal energy can result in different driving forces. Thus, although the relations derived here are qualitatively valid, there may be some quantitative differences found in different systems. Different thermal resistances will result in a shift in temperature and/or time requirements.

The systems tested here tend to have high thermal resistance. For systems with less thermal resistance, lower source temperatures will suffice to provide equivalent results.

The data indicates that continuous as well as batch processes can be used. The relationships we have just discussed are equally valid for both. Based on the data presented herein, a number of different reactors can be used. Examples of these include, but are not limited to a heated rotary drier; a stirred reactor; a fluidized bed and the like. The reaction can occur at ambient pressure or under a vacuum. The reaction can occur in air or a variety of atmospheres, inert or otherwise.

As a further example, an indirectly heated rotary drier having the same residence time as for example the DVT 130, would provide similar results under the same operating conditions.

Having described out invention, we claim as follows:

1. A method of producing polysuccinimide, comprising the steps
   a). introducing powdered L-aspartic acid to a indirectly, heated rotary drier;
   b). heating the powdered L-aspartic acid rapidly to a temperature of at least 370° F. initiate the condensation reaction;
   c). rapidly raising the temperature to at least 440° F.; and
   d). maintaining at least the 440° F. temperature until at least 80% conversion has been achieved.

2. A method of producing polyaspartic acid, comprising base hydrolyzing the polysuccinimide produced in claim 1.

* * * * *